(12) United States Patent
Sugiyama

(10) Patent No.: US 7,953,305 B2
(45) Date of Patent: May 31, 2011

(54) OPTICAL WAVEGUIDE DEVICE AND PRODUCING METHOD THEREOF

(75) Inventor: Masaki Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 302 days.

(21) Appl. No.: 12/382,825

(22) Filed: Mar. 24, 2009

(65) Prior Publication Data

US 2009/0324157 A1    Dec. 31, 2009

(30) Foreign Application Priority Data

Jun. 27, 2008   (JP) ................. 2008-168395

(51) Int. Cl.
    *G02B 6/12* (2006.01)
(52) U.S. Cl. .......... 385/14; 385/1; 385/2; 385/3; 385/8; 385/129
(58) Field of Classification Search .......... 385/1, 2, 385/3, 8, 9, 14, 129
    See application file for complete search history.

(56) References Cited

U.S. PATENT DOCUMENTS

| | | | |
|---|---|---|---|
| 6,033,126 A * | 3/2000 | Omori et al. | 385/88 |
| 7,224,869 B2 * | 5/2007 | Cole et al. | 385/40 |

FOREIGN PATENT DOCUMENTS

| | | |
|---|---|---|
| JP | 07-056199 | 3/1995 |
| JP | 8-278422 | 10/1996 |
| JP | 2000-121850 | 4/2000 |
| JP | 2008-46573 | 2/2008 |

OTHER PUBLICATIONS

Patent Abstracts of Japan, Publication No. 07-056199, published Mar. 3, 1995.
Patent Abstracts of Japan, Publication No. 2000-121850, published Apr. 28, 2000.

* cited by examiner

*Primary Examiner* — Jennifer Doan
(74) *Attorney, Agent, or Firm* — Staas & Halsey LLP

(57) ABSTRACT

An optical waveguide device includes; a substrate having an electro-optic effect, and a first optical waveguide and a second optical waveguide formed substantially in parallel on a top face of the substrate. A groove is formed for cutting only the first optical waveguide, of the first optical waveguide and the second optical waveguide. The groove penetrates from the top face to a bottom face of the substrate. Such a groove can be formed for example by fixing a side face of the substrate on the second optical waveguide side to a supporting base of a dicing machine so that the first optical waveguide is positioned on an upper side and the second optical waveguide is positioned on a lower side, and advancing the dicing saw from the bottom face side to the top face side of the substrate.

24 Claims, 9 Drawing Sheets

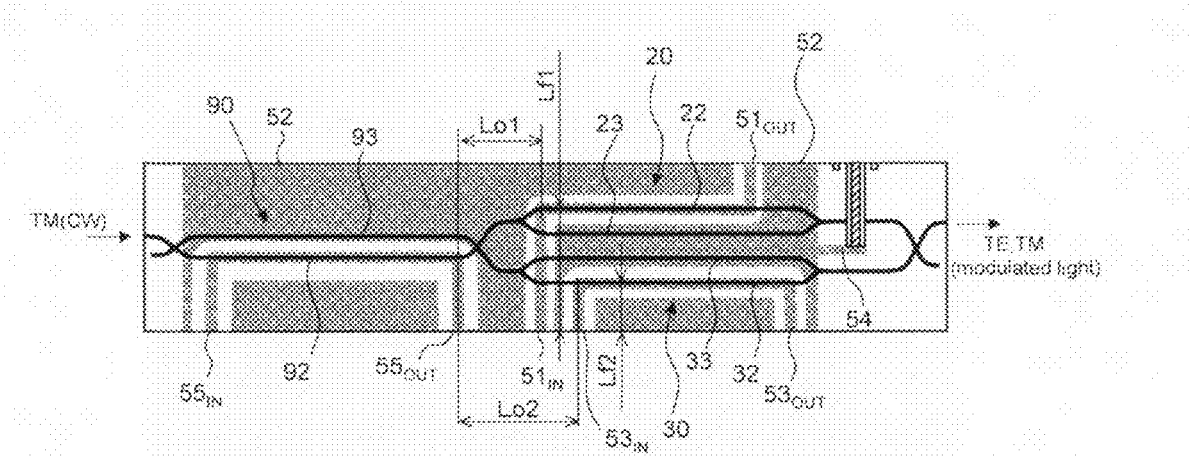
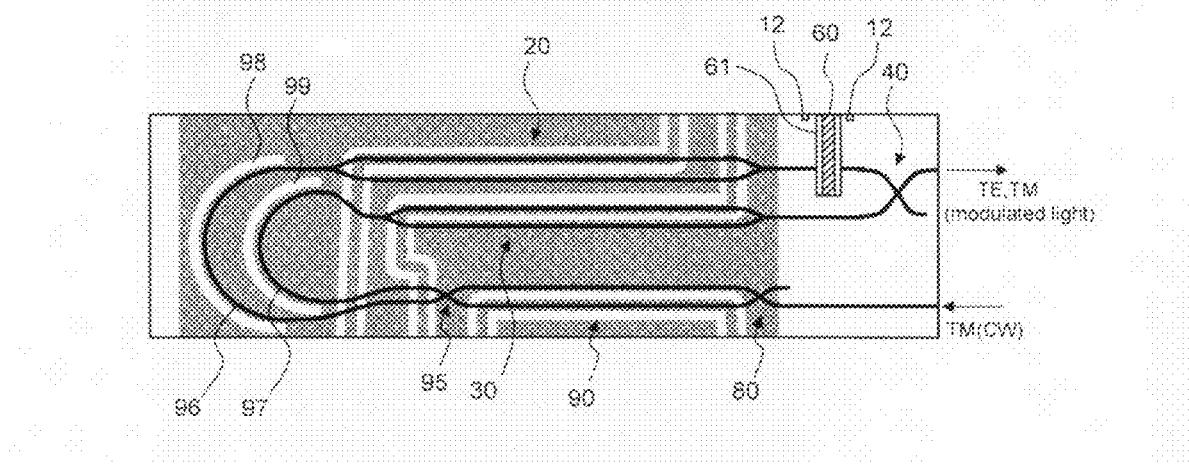

OPTICAL WAVEGUIDE DEVICE AND PRODUCING METHOD THEREOF

CROSS-REFERENCE TO RELATED APPLICATION

This application is based upon and claims the benefit of priority of the prior Japanese Patent Application No. 2008-168395, filed on Jun. 27, 2008, the entire contents of which are incorporated herein by reference.

FIELD

The present invention relates to an optical waveguide device used in optical communication, and a producing method thereof.

BACKGROUND

An optical waveguide device using an electro-optic crystal such as lithium niobate ($LiNbO_3$) or lithium tantalate ($LiTaO_3$) is formed by forming a metal film, such as titanium (Ti), on a part on a crystal substrate, and then thermally diffusing, or proton-exchanging in benzoic acid after patterning, to thereby form an optical waveguide, and then providing an electrode near the optical waveguide. As such an optical waveguide device using an electro-optic crystal, for example, an optical modulator as illustrated in FIG. 14 is known.

In FIG. 14, an optical waveguide formed on a substrate 100 includes; an input waveguide 101, a pair of branched waveguides 102 and 103, and an output waveguide 104. On the pair of branched waveguides 102 and 103, a signal electrode 105 and a ground electrode 106 are provided to form a coplanar electrode. In the case where a Z-cut substrate is used, the signal electrode 105 and the ground electrode 106 are arranged immediately above the optical waveguide, in order to use the refractive index change due to an electric field in the Z direction. More specifically, the signal electrode 105 is patterned on the branched waveguide 102 and the ground electrode 106 is patterned on the branched waveguide 103. Here, in order to prevent light propagating in the branched waveguides 102 and 103 from being absorbed by the signal electrode 105 and the ground electrode 106, a buffer layer (not illustrated in the drawing) is provided between the substrate 100, and the signal electrode 105 and the ground electrode 106. As the buffer layer, silicon oxide ($SiO_2$) or the like having a thickness of from 0.2 to 2 (μm) is used.

In the case where such an optical modulator is driven at high speed, an output terminal $105_{OUT}$ of the signal electrode 105 is connected to the ground electrode 106 via a resistance (not illustrated in the drawing) to give a traveling wave electrode, and a microwave electric signal is applied from an input terminal $105_{IN}$ of the signal electrode 105. At this time, the refractive indices of the branched waveguides 102 and 103 respectively change to such as +na and −nb due to an electric field generated between the signal electrode 105 and the ground electrode 106, to thereby change the phase difference of light propagating on the branched waveguides 102 and 103. Therefore, intensity-modulated signal light is output from the output waveguide 104 due to Mach-Zehnder interference.

An effective refractive index of the microwave electric signal can be controlled by changing a cross-sectional shape of the signal electrode 105, and a high-speed optical responsive characteristic can be obtained by matching the speeds of the light and the microwave electric signal.

It has been proposed to use two such optical modulators and input the output beams thereof to a polarization beam combiner (PBC) as illustrated in FIG. 15, so that the planes of polarization of the respective output beams are orthogonal to each other, to thereby constitute a transmitter for polarization multiplexed communication. If this proposal is further developed and the two optical modulators and the PBC are formed on one substrate and made as a chip, the respective optical modulators and the PBC need not be connected to each other by an optical fiber, and the size of the transmitter can be reduced.

However, since the above-described optical modulator normally modulates TM-mode light having excellent modulation efficiency, the plane of polarization of the output beam of one optical modulator needs to be rotated by about 90°, in order to input the output beams of the two optical modulators into the PBC with their planes of polarization orthogonal to each other. Therefore, it can be considered to form a groove for cutting the output waveguide of one optical modulator, and insert a wave plate into the formed groove.

As a technique for forming the groove for cutting the optical waveguide, one using dicing has been heretofore known (refer to Japanese Laid-open Patent Publication Nos. 07-56199 and 2000-121850).

In formation of the groove by the conventional dicing, as illustrated in FIG. 16, a bottom face of the substrate 100 having the optical waveguides (101 to 104) formed on a top face thereof is fixed on a supporting base 4 such as a cutting table, and a dicing blade 5 is advanced from a side face of the substrate 100.

However, in this method there is the following problem. That is to say, in the case where the two optical modulators are made as one chip as described above, the output waveguides of the two optical modulators are adjacent to each other. Therefore, in the formation of the groove by the conventional dicing process, when a groove for cutting only the output waveguide of one optical modulator is to be formed, the output waveguide of the other optical modulator may be erroneously subjected to damage such as cutting. Consequently there remains a problem in productivity of the optical waveguide device in that the yield of the dicing process (groove forming process) may be worsened, high accuracy is required for dicing, and the like.

Such a problem is not limited to the case where the two optical modulators or the like are made as one chip as mentioned above, and can be said to be one that commonly occurs in the case of forming a groove for cutting only one optical waveguide of two optical waveguides formed substantially in parallel on the substrate.

SUMMARY

According to one aspect of the present invention, an optical waveguide device is provided. The optical waveguide device includes; a substrate having an electro-optic effect, and a first optical waveguide and a second optical waveguide formed substantially in parallel on a top face of the substrate. Moreover it has a groove that is configured to cut only the first optical waveguide, of the first optical waveguide and the second optical waveguide. The groove is formed in a side face of the substrate on a first optical waveguide side, and penetrates from the top face to a bottom face of the substrate.

According to another aspect of the present invention, an optical waveguide device functioning as an optical modulator that supports polarization multiplexing is provided. The optical waveguide device includes: (a) a substrate having the electro-optic effect; (b) a first optical modulating section formed on a top face of the substrate, and having an optical waveguide, and a signal electrode and a ground electrode that are arranged to modulate light propagating on the optical waveguide; (c) a second optical modulating section formed on the top face of the substrate substantially in parallel with the first optical modulating section, and having an optical waveguide, and a signal electrode and a ground electrode that are arranged to modulate light propagating on the optical waveguide; (d) a mode conversion element arranged in a middle of an output waveguide of the first optical modulating section, that converts TM/TE modes of light propagating on the output waveguide; and (e) a coupling section, formed on the top face of the substrate, that polarization-couples output light of the first optical modulating section that has passed through the mode conversion element, with output light of the second optical modulating section, to generate polarization-multiplexed light. The mode conversion element is inserted into a groove that is configured to cut only an output waveguide of the first optical modulating section, of the optical waveguides formed on the top face of the substrate, and the groove is formed in a side face of the substrate on the first optical modulating section side, and penetrates from the top face to a bottom face the substrate.

According to yet another aspect of the present invention, a method of producing an optical waveguide device is provided. The producing method of the optical waveguide device, includes: (a) forming a first optical waveguide and a second optical waveguide substantially in parallel on a top face of a substrate having an electro-optic effect; (b) fixing one side face of the substrate so that the first optical waveguide is positioned on an upper side and the second optical waveguide is positioned on a lower side; and (c) forming, in the other side face of the substrate, a groove that is configured to cut only the first optical waveguide, of the first optical waveguide and the second optical waveguide, and that penetrates from the top face to a bottom face of the substrate, by advancing a dicing saw from the top face side to the bottom face side of the substrate or from the bottom face side to the top face side of the substrate.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF DRAWINGS

FIG. 12 is a diagram illustrating a modification example of the optical waveguide device according to the second embodiment;

FIG. 13 is a diagram illustrating a modification example of the optical waveguide device according to the second embodiment;

DESCRIPTION OF EMBODIMENTS

At first is a description of a basic concept common to respective embodiments described below. For example, in the case where two optical waveguides are arranged substantially in parallel on a top face of a substrate, and an optical component such as a wave plate is arranged in the middle of one optical waveguide to constitute an optical waveguide device, it is considered to form a groove for cutting only one optical waveguide and insert the optical component into the formed groove.

Figure 16:
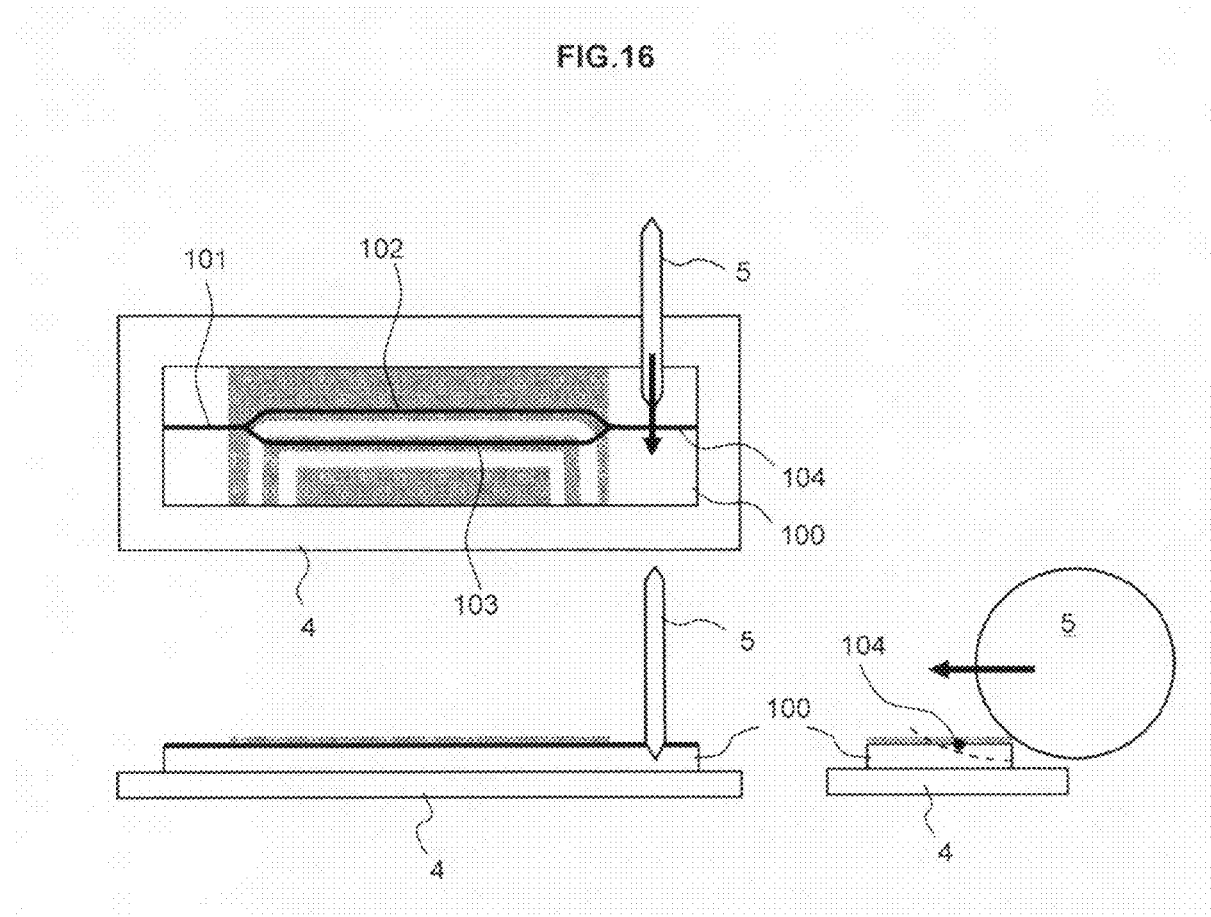
FIG. 16 is a diagram for explaining a method of forming a groove by a conventional dicing process.

Formation of such a groove is generally performed by dicing process. However, because the two optical waveguides are provided adjacent to each other, then as previously mentioned, in the formation of the groove by the conventional dicing process (see FIG. 16), at the time of forming a groove for cutting only one optical waveguide, the other optical waveguide may be cut erroneously.

In order to prevent such a situation, in embodiments of the present invention, the dicing process is not performed by fixing the bottom face of the substrate on the supporting base of a dicing machine as in the conventional manner, but the dicing process is performed by rotating the substrate by about 90° from the conventional position and fixing a side face of the substrate to the supporting base of the dicing machine.

Figure 1:
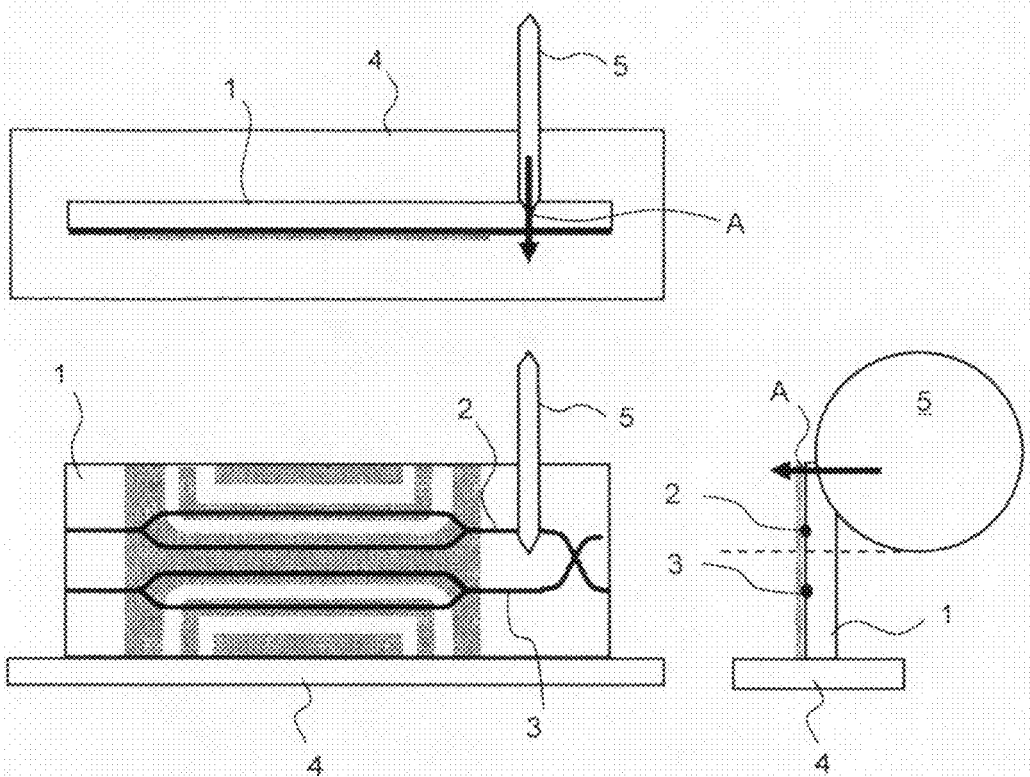
FIG. 1 is a diagram for illustrating an outline of embodiments.

Specifically, as illustrated in FIG. 1, one side face of a substrate 1 (that is, the side face on an optical waveguide 3 side) is fixed on a supporting base 4 of the dicing machine so that, of the two optical waveguides 2 and 3 formed substantially in parallel on the top face of the substrate 1, one optical waveguide 2 to be cut is positioned on an upper side and the other optical waveguide 3 not to be cut is positioned on a lower side. Then the position (height) of a dicing blade 5 in a vertical direction is adjusted in this state by matching with the optical waveguide 2 positioned on the upper side, and thereafter, as indicated by arrow A, the dicing blade 5 is advanced from the bottom face side to the top face side of the substrate 1. It is desired that the dicing blade 5 is advanced from the bottom face side to the top face side of the substrate 1. However it can be advanced from the top face side to the bottom face side. As a result, a groove that cuts only the one optical waveguide 2 of the two optical waveguides 2 and 3 formed substantially in parallel on the top face of the substrate 1, and that penetrates from the top face to the bottom face of the substrate 1, is formed on the other side face of the substrate 1 (that is, the side face on the optical waveguide 2 side).

Generally, it is difficult to strictly perform the control in a traveling direction of the dicing blade 5, however a vertical direction (height) thereof can be set with relatively high accuracy. Therefore, by adopting the above-described forming method for the groove and the shape of the groove, the damage to the other optical waveguide 3 can be effectively prevented while cutting the one optical waveguide 2. As a result, the yield of the dicing process (groove forming process) is improved, and productivity of the optical waveguide device having the groove that cuts only one optical waveguide of the two optical waveguides arranged substantially in parallel can be considerably improved.

Hereunder is a description of the respective embodiments.

Figure 2:
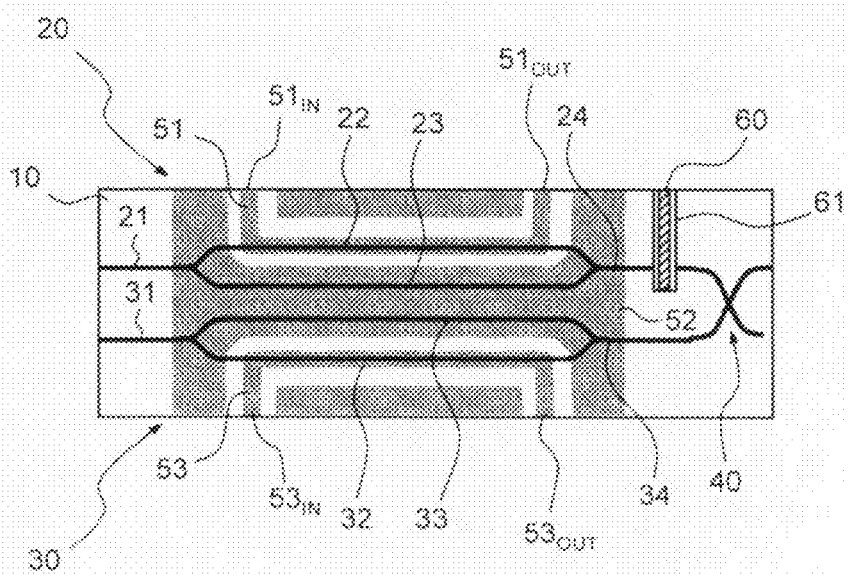
FIG. 2 is a plan view illustrating a configuration of an optical waveguide device according to a first embodiment.

FIG. 2 is a plan view illustrating a configuration of an optical waveguide device according to a first embodiment. This optical waveguide device functions as a polarization multiplexing modulator. It modulates input light using two optical modulating sections, and inputs the output beams from the respective optical modulating sections into a wave coupling section with the planes of polarization made orthogonal to each other, and performs polarization synthesis in the wave coupling section to thereby generate and output polarization multiplexed light.

In FIG. 2, the optical waveguide device according to this embodiment includes; a substrate 10 having the electro-optic effect, a first optical modulating section 20 and a second optical modulating section 30 formed on the substrate 10, and a wave coupling section 40 formed on the substrate 10.

The substrate 10 is an LN substrate formed for example from Z-cut lithium niobate ($LiNbO_3$:LN). Instead of the LN substrate, this can be an LT substrate formed from lithium tantalate ($LiTaO_3$:LT). Moreover an X-cut substrate can be used instead of the Z-cut substrate.

The first optical modulating section 20 and the second optical modulating section 30 have substantially the same configuration, and are formed on the substrate 10 substantially in parallel. The first optical modulating section 20 includes an optical waveguide, and a signal electrode 51 and ground electrode 52 for modulating light propagating on the optical waveguide. Moreover the second optical modulating section 30 includes an optical waveguide, and a signal electrode 53 and the ground electrode 52 for modulating light propagating on the optical waveguide. Here in this embodiment, the ground electrode 52 is used commonly as the ground electrode of the first optical modulating section 20 and the ground electrode of the second optical modulating section 30, but ground electrodes may be provided separately.

The optical waveguide of the first optical modulating section 20 includes; an input waveguide 21, a pair of branched waveguides 22 and 23 branched from the input waveguide 21, and an output waveguide 24 formed by the pair of branched waveguides 22 and 23 combined together, to thereby form a Mach-Zehnder interferometer. Similarly the optical waveguide of the second optical modulating section 30 includes; an input waveguide 31, a pair of branched waveguides 32 and 33 branched from the input waveguide 31, and an output waveguide 34 formed by the pair of branched waveguides 32 and 33 combined together, to thereby form a Mach-Zehnder interferometer.

The signal electrode 51 of the first optical modulating section 20 is formed along immediately above the one branched waveguide 22 of the first optical modulating section 20, and the signal electrode 53 of the second optical modulating section 30 is formed along immediately above the one branched waveguide 32 of the second optical modulating section 30. Moreover the ground electrode 52 commonly used for the first optical modulating section 20 and the second optical modulating section 30 is isolated from the signal electrode 51 of the first optical modulating section 20 and the signal electrode 53 of the second optical modulating section 30, and is formed to include a part formed along immediately above the other branched waveguide 23 of the first optical modulating section 20 and the other branched waveguide 33 of the second optical modulating section 30.

Here in the signal electrode 51 of the first optical modulating section 20, an output terminal $51_{OUT}$ thereof is connected to the ground electrode 52 via a resistance (not illustrated in the drawing) to form a traveling wave electrode of the first optical modulating section 20, so that a microwave electric signal is applied from an input terminal $51_{IN}$. Moreover in the signal electrode 53 of the second optical modulating section 30, an output terminal $53_{OUT}$ is connected to the ground electrode 52 via a resistance (not illustrated in the drawing) to form a traveling wave electrode of the second optical modulating section 30, so that a microwave electric signal is applied from an input terminal $53_{IN}$.

Although not illustrated in the drawing, the signal electrode 51 of the first optical modulating section 20, the ground electrode 52, and the signal electrode 53 of the second optical modulating section 30, are formed on the substrate 1 (optical waveguide) via a buffer layer using silicon oxide ($SiO_2$) or the like.

The wave coupling section 40 is configured as a polarization beam combiner (PBC) that receives the input of two beams with orthogonal planes of polarization, and couples (polarization synthesizes) the beams while maintaining the polarization direction of the respective beams, to generate polarization multiplexed light. The wave coupling section 40 in this embodiment realizes a function as the polarization beam combiner (PBC) by having an X-crossing type optical waveguide structure.

As described above, in this embodiment, a Z-cut LN substrate is used, and the first optical modulating section 20 and the second optical modulating section 30 modulate TM-mode light having excellent modulation efficiency (in the case of X-cut, TE-mode light is modulated). Therefore, in order to input light with orthogonal planes of polarization to the wave coupling section 40, the plane of polarization of the output light from the first optical modulating section 20 or the output light from the second optical modulating section 30 needs to be rotated by about 90°.

Regarding this point, in the optical waveguide device according to this embodiment, a ½ wave plate 60 that rotates the plane of polarization of light by about 90°, is arranged as a mode conversion element that converts TM-mode light to TE-mode light, in the middle of the output waveguide 24 of the first optical modulating section 20. Specifically, a groove 61 for cutting the output waveguide 24 of the first optical modulating section 20 is formed, and the ½ wave plate 60 is inserted into the formed groove 61 and is secured by an adhesive.

Here a producing method for the optical waveguide device according to the first embodiment is briefly described.

At first a metal film such as titanium (Ti) is formed on a top face of the optically polished LN substrate 1, and then is thermally diffused, or is proton-exchanged in benzoic acid after patterning, to thereby form the optical waveguides, that is, the optical waveguides of the first optical modulating section 20 (the input waveguide 21, the branched waveguides 22 and 23, and the output waveguide 24), the optical waveguides of the second optical modulating section 30 (the input waveguide 31, the branched waveguides 32 and 33, and the output waveguide 34), and the wave coupling section 40.

When formation of the optical waveguide on the LN substrate 1 is complete, a buffer layer is formed on the top face of the LN substrate 1 by using, for example, a CVD method, and then the signal electrode 51 of the first optical modulating section 20, the ground electrode 52, and the signal electrode 53 of the second optical modulating section 30 are formed on the buffer layer by patterning. As a result, the two optical modulating sections (the first optical modulating section 20 and the second optical modulating section 30) and the wave coupling section 40 are formed on the top face of the LN substrate 1.

Next, in order to arrange the ½ wave plate 60 in the middle of the output waveguide 24 of the first optical modulating section 20, the groove 61 for cutting only the output waveguide 24 of the first optical modulating section 20 is formed. Here, the output waveguide 24 of the first optical modulating section 20 and the output waveguide 34 of the second optical modulating section 30 are adjacent to each other, and the output waveguide 34 of the second optical modulating section 30 may be damaged at the time of forming the groove 61 for cutting only the output waveguide 24 of the first optical modulating section 20. Therefore, the groove 61 is formed by a method such as illustrated in FIG. 1.

That is to say, in order to arrange the output waveguide 24 of the first optical modulating section 20 to be positioned on the upper side and the output waveguide 34 of the second optical modulating section 30 to be positioned on the lower side, one side face of the substrate 10 (the side face of the substrate 10 on the second optical modulating section 30 side) is fixed to the supporting base of the dicing machine. Then the vertical position (height) of the dicing blade is adjusted to match with the output waveguide 24 of the first optical modulating section 20 positioned on the upper side, after which the dicing machine is operated to advance the dicing blade from the bottom face side to the top face side of the substrate 10, or from the top face side to the bottom face side of the substrate 10.

Figure 3:
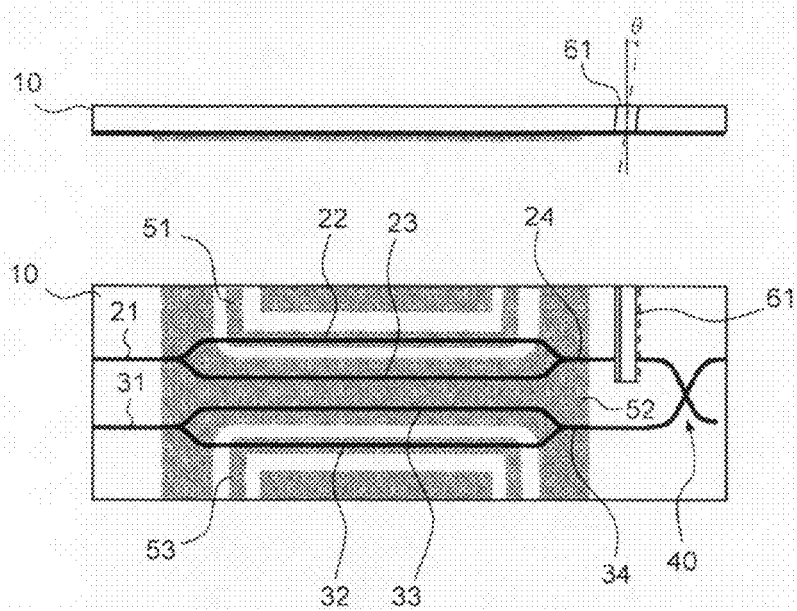
FIG. 3 is a diagram for explaining a groove for cutting an output waveguide of a first optical modulating section, in the optical waveguide device according to the first embodiment.

As a result, on the other side face of the substrate 10 (the side face of the substrate 10 on the first optical modulating section 20 side), the groove 61 for cutting only the output waveguide 24 of the first optical modulating section 20 and that penetrates from the top face to the bottom face of the substrate 10 is formed. Here, in order to avoid reflected return light, it is desired that the groove 61 is formed so as to be inclined by a predetermined angle θ (for example, 5°) from perpendicular with respect to the output waveguide 24 of the first optical modulating section 20, as illustrated in FIG. 3.

Then the ½ wave plate 60 is inserted into the formed groove 61 and fixed by an adhesive, thereby completing production of the optical waveguide device. As the adhesive, so as not to increase optical loss, one having a refractive index substantially the same as the refractive index of the ½ wave plate 60 to be inserted is used.

Figure 4:
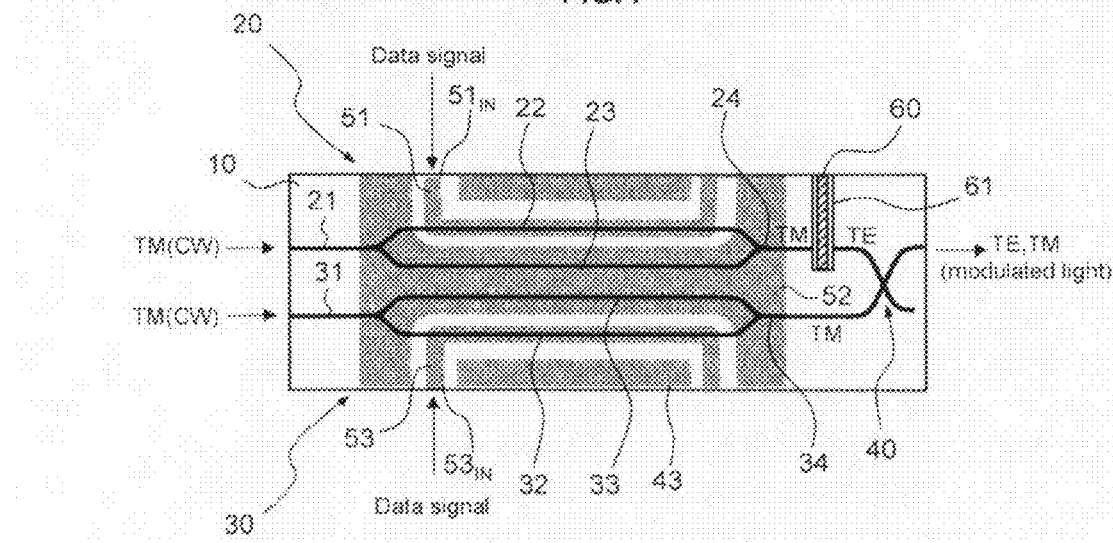
FIG. 4 is a diagram for explaining an operation of the optical waveguide device according to the first embodiment.

Next the operation of the optical waveguide device according to the first embodiment is described with reference to FIG. 4. At first, TM-mode light (CW light) is respectively input from outside to the input waveguide 21 of the first optical modulating section 20 and the input waveguide 31 of the second optical modulating section 30. Here the light to be input to the input waveguide 21 of the first optical modulating section 20 and the input waveguide 31 of the second optical modulating section 30 is obtained by branching output light, for example from one light source, using a branching filter or the like (not illustrated in the drawing).

The light input to the input waveguide 21 of the first optical modulating section 20 is branched into two and respectively transmitted to the branched waveguides 22 and 23. A data signal is applied from the input terminal $51_{IN}$ of the signal electrode 51 of the first optical modulating section 20 as the microwave electric signal, to thereby output signal light (TM-mode) intensity-modulated according to the data signal, from the output waveguide 24. This intensity-modulated signal light (TM-mode) is mode-converted to give TE-mode signal light, at the time of passing through the ½ wave plate 60 arranged in the middle of the output waveguide 24.

Similarly the light input to the input waveguide 31 of the second optical modulating section 30 is branched into two and respectively transmitted to the branched waveguides 32 and 33. Similarly to the first optical modulating section 20, when the data signal is applied from the input terminal $53_{IN}$ of the signal electrode 53 of the second optical modulating section 30 as the microwave electric signal, the signal light (TM-mode) intensity-modulated according to the data signal, is output from the output waveguide 34.

Then the wave coupling section 40 receives the input of the output light (TE-mode) from the first optical modulating section 20 through the ½ wave plate 60, and the output light (TM-mode) from the second optical modulating section 30, and couples the lights while maintaining the respective polarization directions, and outputs the polarization multiplexed light.

In the optical waveguide device according to this embodiment described above, the first optical modulating section 20, the second optical modulating section 30, and the wave coupling section 40 are formed on one substrate 10, and the groove 61 for cutting only the output waveguide 24 of the first optical modulating section 20 is formed, and the ½ wave plate 60 is inserted into the formed groove 61. As a result, the optical waveguide device can be used as a transmitter for polarization multiplexed communication, and the size of the transmitter can be considerably reduced as compared to a conventional transmitter.

Here the groove 61 into which the ½ wave plate 60 is inserted, is formed by fixing one side face of the substrate 10 onto the supporting base of the dicing machine so that the output waveguide 24 of the first optical modulating section 20 is positioned on the upper side and the output waveguide 34 of the second optical modulating section 30 is positioned on the lower side, and by advancing the dicing blade from the bottom face side to the top face side of the substrate 10 or from the top face side to the bottom face side. The groove 61 formed in this manner cuts only the output waveguide 24 of the first optical modulating section 20, and is formed in the side face of the substrate 10 on the first optical modulating section 20 side, and penetrates from the top face to the bottom face of the substrate 10. By adopting such a forming method and shape for the groove 61, forming of the groove 61 for cutting only the output waveguide 24 of the first optical modulating section 20 can be easily performed by dicing process, without cutting into the output waveguide 34 of the second optical modulating section 30. As a result, the productivity of an optical waveguide device that can correspond to polarization multiplexed communication can be considerably improved.

In the abovementioned optical waveguide device, the ½ wave plate 60 is used as the mode conversion element which converts the TM-mode light into the TE-mode. However, the wave plate is not limited thereto, and for example, a wave plate having an optical thickness of (N+½) wavelengths (N=1, 2, 3, . . . ) can be used, or two ¼ wave plates can be combined, or a Faraday rotor can be used. Moreover, the configuration may be such that the substrate 10 is an X-cut substrate, TE-mode lights are respectively input from outside to the input waveguide 21 of the first optical modulating section 20 and the input waveguide 31 of the second optical modulating section 30, and the output light from the first optical modulating section 20 is converted to TM-mode.

Next modification examples of the optical waveguide device according to the first embodiment is illustrated in FIG. 5 to FIG. 10.

FIRST MODIFICATION EXAMPLE

Figure 5:
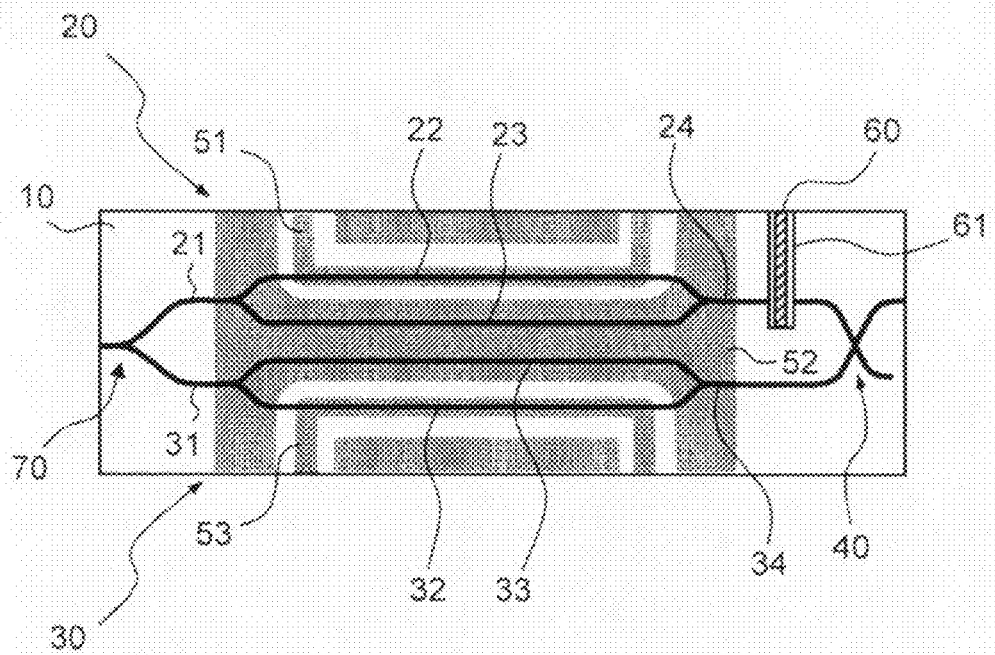
FIG. 5 is a diagram illustrating a modification example of the optical waveguide device according to the first embodiment.

In the optical waveguide device according to the above-mentioned first embodiment, two lights are input. However, as illustrated in FIG. 5, a wave branching section 70 that branches the input light into two and supplies the light to the first optical modulating section 20 and the second optical modulating section 30, may be further formed on the top face of the substrate 10. The wave branching section 70 can be formed for example as a waveguide type 1×2 coupler.

In this case, the wave branching section 70 is formed in such a manner that a metal film such as titanium (Ti) is formed on the top face of the LN substrate 10, together with the optical waveguide of the first optical modulating section 20, the optical waveguide of the second optical modulating section 30, and the wave coupling section 40, and then thermally diffused, or proton-exchanged in benzoic acid after patterning.

By so doing, the light from one light source can be input to the first optical modulating section 20 and the second optical modulating section 30, and intensity-modulated by the respective optical modulating sections. Here a branching ratio of the wave branching section 70 may be 1:1 (3 dB). However, it is desired to adjust the branching ratio so that the power of the output light from the first optical modulating section 20 via the ½ wave plate 60, and the power of the output light from the second optical modulating section 30 become equal to each other, taking a loss due to the ½ wave plate 60 and the groove 61 into consideration. In this case, the branching ratio of the wave branching section 70 becomes larger on the first optical modulating section 20 side than on the second optical modulating section 30 side by the portion corresponding to the loss.

SECOND MODIFICATION EXAMPLE

Figure 6:
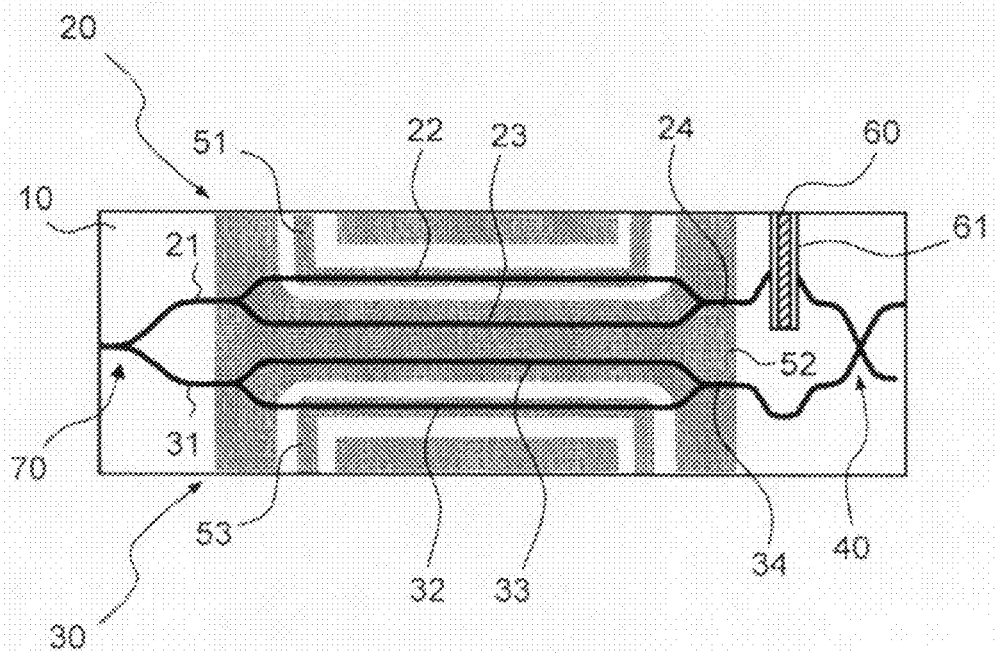
FIG. 6 is a diagram illustrating a modification example of the optical waveguide device according to the first embodiment.

Even when the above described forming method for the groove, and shape of the groove are adopted, in order to ensure even better productivity of the optical waveguide device, it is desired that a gap between the output waveguide 24 of the first optical modulating section 20 and the output waveguide 34 of the second optical modulating section 30 be equal to or larger than 100 (μm). Therefore, as illustrated in FIG. 6, as required, at least one of the output waveguide 24 of the first optical modulating section 20 and the output waveguide 34 of the second optical modulating section 30 (both in FIG. 6) may be curved so as to expand the gap therebetween. In this case, the groove 61 cuts the output waveguide 24 of the first optical modulating section 20 at a position where the gap between the two output waveguides 24 and 34 is expanded (more preferably, at a position where the gap is expanded most).

THIRD MODIFICATION EXAMPLE

Figure 7:
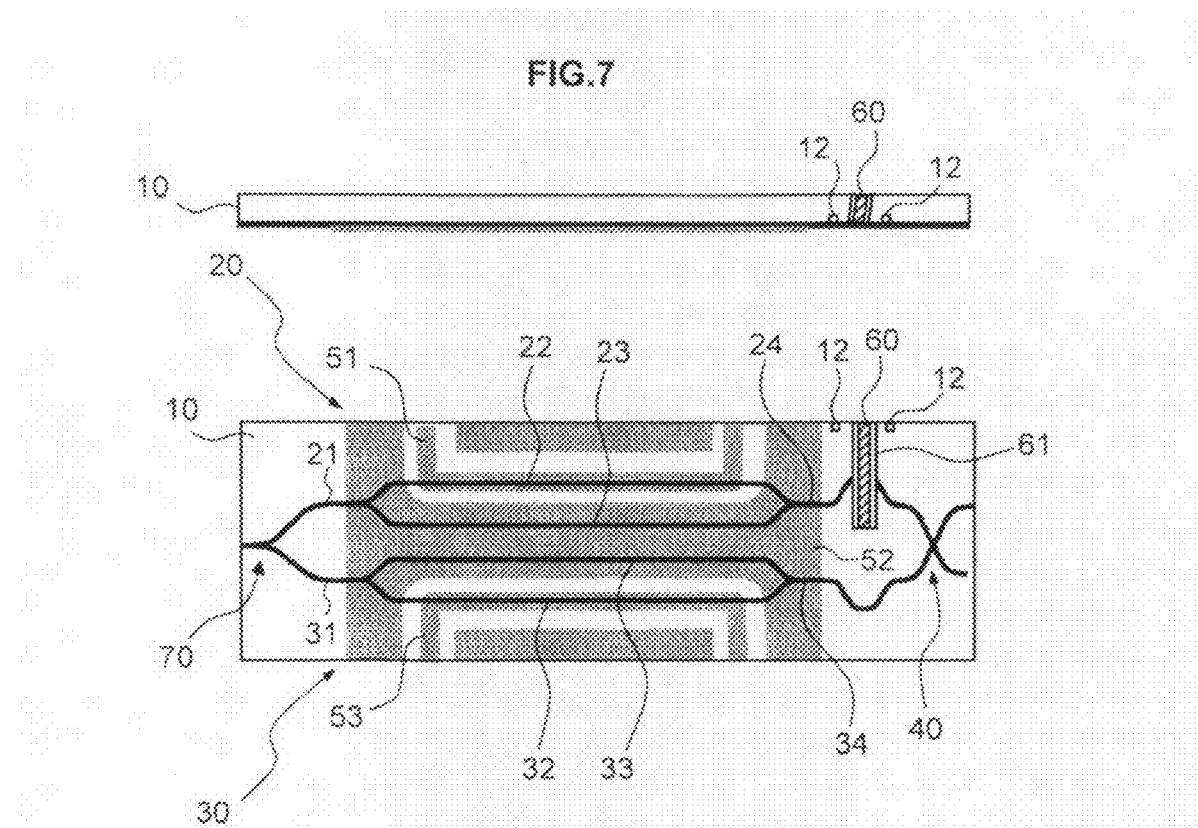
FIG. 7 is a diagram illustrating a modification example of the optical waveguide device according to the first embodiment.

In the above described groove forming method, since the dicing process is performed with the side face of the substrate 10 directed upward, it is difficult to set the position where the groove 61 is to be formed (that is, a horizontal position of the dicing blade). Therefore, as illustrated in FIG. 7, a pair of notches 12, 12 which become markers at the time of performing the dicing process, may be formed beforehand in the edge of the top face of the substrate 10 on the first optical modulating section 20 side. Since the notches 12, 12 formed in this manner at the edge of the top face of the substrate 10 also appear on the side face side of the substrate 10, if the dicing blade is positioned between the notches 12, 12 at the time of performing the dicing process, the groove 61 can be easily formed at an appropriate position. The optical waveguide device formed in this manner has a pair of notches 12, 12 sandwiching the groove 61, in the edge of the top face of the substrate 10 on the first optical modulating section 20 side.

The notches 12, 12 can be easily formed by cutting, dry etching, or the like, and a formation stage thereof can be scheduled anywhere before the dicing process. That is to say, the notches 12, 12 may be formed before forming the optical waveguide on the substrate 10, or the notches 12, 12 may be formed after forming the optical waveguide on the substrate 10, or after forming the electrode.

Here, in the case where at least one of the output waveguide 24 of the first optical modulating section 20 and the output waveguide 34 of the second optical modulating section 30 is curved to expand the gap therebetween, the notches 12, 12 are formed so as to sandwich a position where the gap between the output waveguides 24 and 34 is expanded most. As a result, a situation where the output waveguide 34 of the second optical modulating section 30 is damaged at the time of the dicing process can be avoided more reliably.

FOURTH MODIFICATION EXAMPLE

Figure 8:
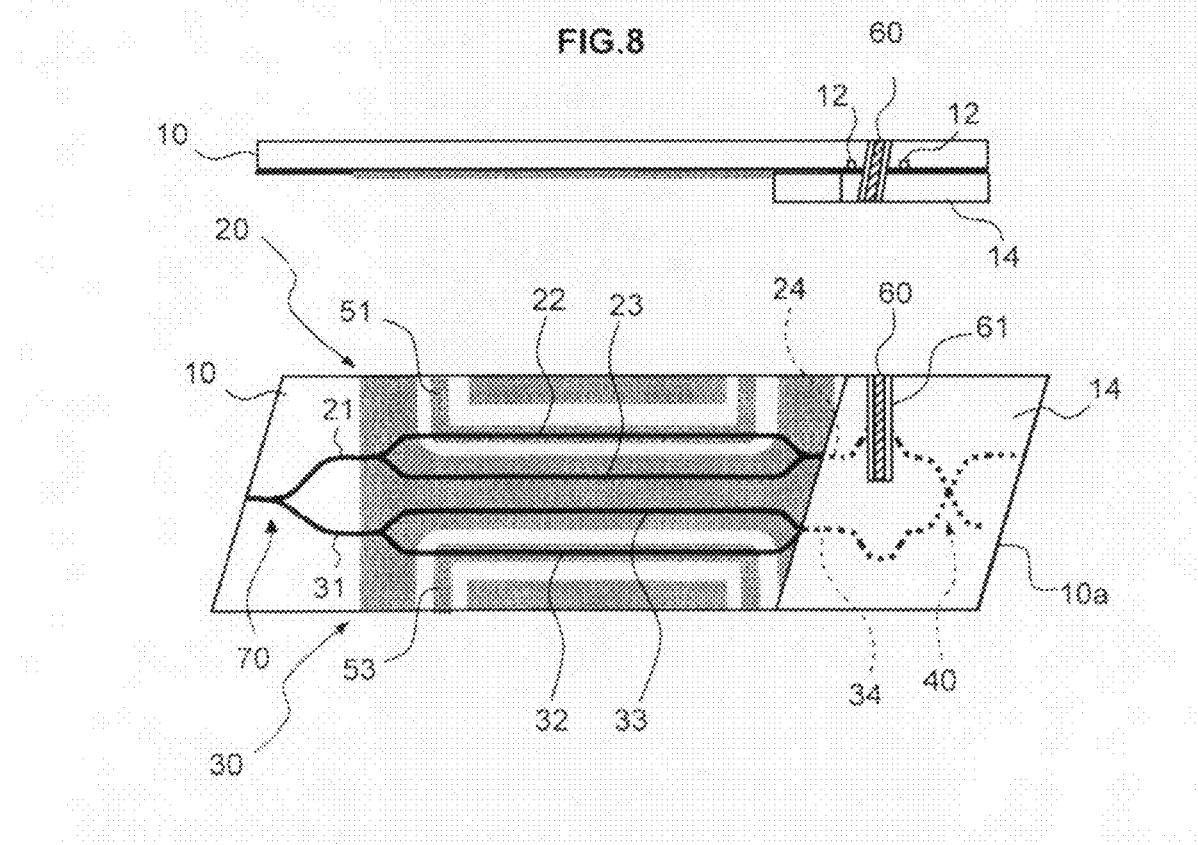
FIG. 8 is a diagram illustrating a modification example of the optical waveguide device according to the first embodiment.

When the groove 61 is formed by the dicing process, the optical loss may increase due to chipping occurring on the output waveguide 24 of the first optical modulating section 20, or surface roughness of the groove 61. In order to prevent this, as illustrated in FIG. 8, a processing support plate 14 (fixture or the like) may be provided on the top surface of the substrate 10 on which the optical waveguide is formed. Such a processing support plate 14 is normally attached to the top face of the substrate 10 using an adhesive. In this case, as illustrated in FIG. 8, the groove 61 is formed so as to penetrate from the top face (surface) of the processing support plate 14 to the bottom face of the substrate 10. Here, rather than attaching the processing support plate 14 to the top face of the substrate 10 immediately before forming the groove 61, it is preferably attached thereto before forming an end face 10a where the waveguide of the optical waveguide device is exposed. By so doing, the one processing support plate 14 can be efficiently used both at the time of forming the end face of the optical waveguide device, and at the time of forming the groove 61 into which the ½ wave plate 60 is inserted.

FIFTH MODIFICATION EXAMPLE

Figure 9A:
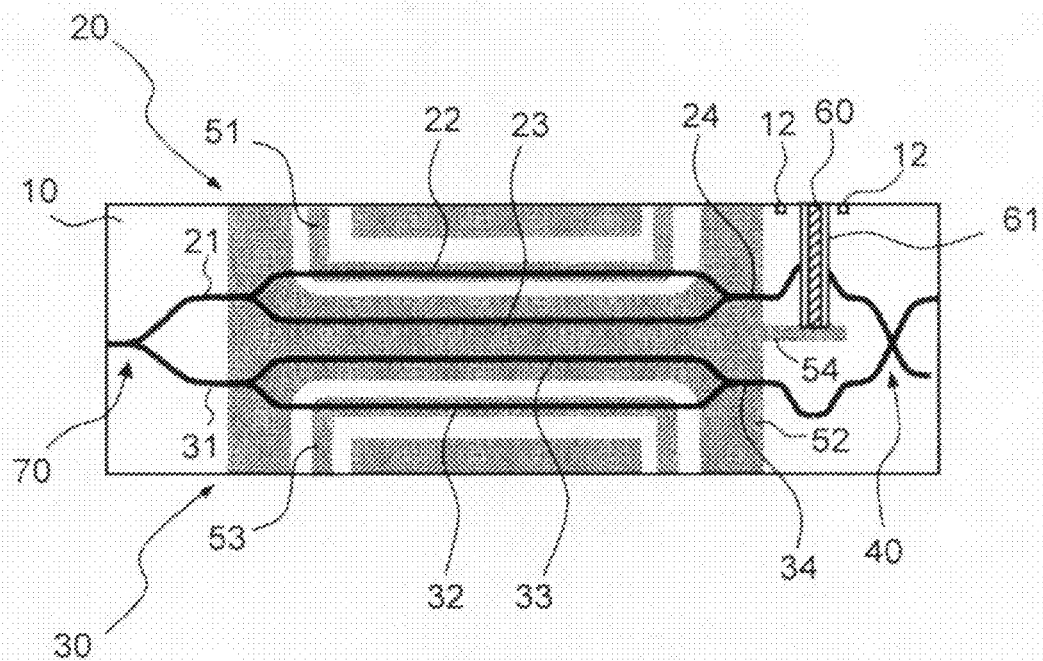
FIGS. 9A and 9B are diagrams illustrating modification examples of the optical waveguide device according to the first embodiment.

As illustrated in FIG. 9A, an electrode 54 positioned between the output waveguide 24 of the first optical modulating section 20 and the output waveguide 34 of the second optical modulating section 30 on the top face of the substrate 10 may be formed, and this electrode 54 may be used at the time of forming the groove 61. Preferably, the electrode 54 is formed so as to conduct with the outside via the ground electrode 52, or the electrode 54 is formed integrally with the ground electrode 52.

Figure 9B:
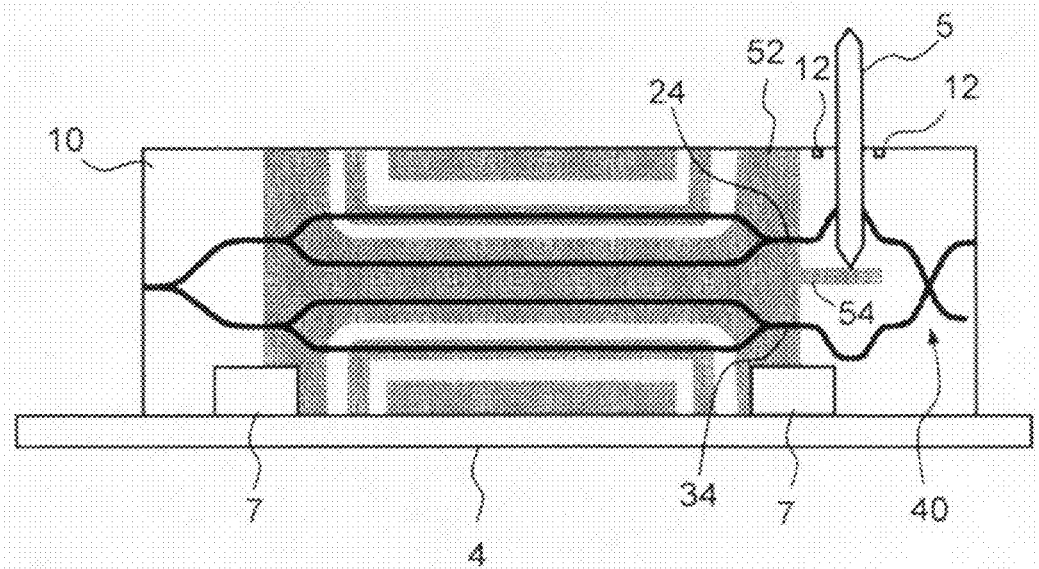

Then when the groove 61 is to be formed, for example, as illustrated in FIG. 9B, the electrode 54 or the ground electrode 52 is made to conduct with the outside (for example, the supporting base 4) via a conductive (for example, metallic) holding member 7 for maintaining the attitude of the substrate 10, and the dicing machine is programmed so that the formation of the groove 61 finishes at a point in time when the dicing blade 5 conducts with the outside (for example, the supporting base 4). By so doing, damage to the output waveguide 34 of the second optical modulating section 30 can be prevented more reliably. The groove 61 formed in this manner has a depth reaching to the electrode 54, as illustrated in FIG. 9A.

SIXTH MODIFICATION EXAMPLE

Figure 10:
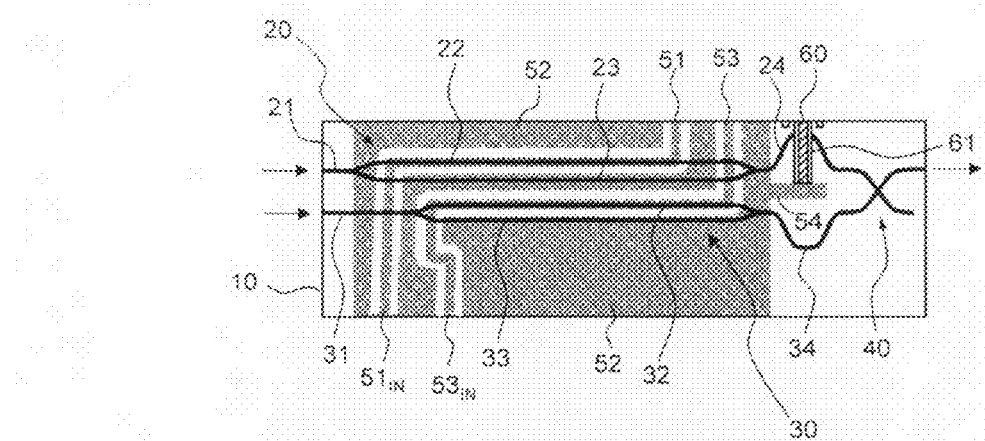
FIG. 10 is a diagram illustrating a modification example of the optical waveguide device according to the first embodiment.

As illustrated in FIG. 10, the input terminal (signal input terminal) $51_{IN}$ of the signal electrode 51 of the first optical modulating section 20, and the input terminal (signal input terminal) $53_{IN}$ of the signal electrode 53 of the second optical modulating section 30 may be arranged on the same side face side of the substrate 10 (the lower side in the drawing). By so doing, two connectors can be arranged on the same side of a package, thereby enabling more compact implementation.

In operation, the above described modification examples can be adopted in an appropriate combination thereof.

Figure 11:
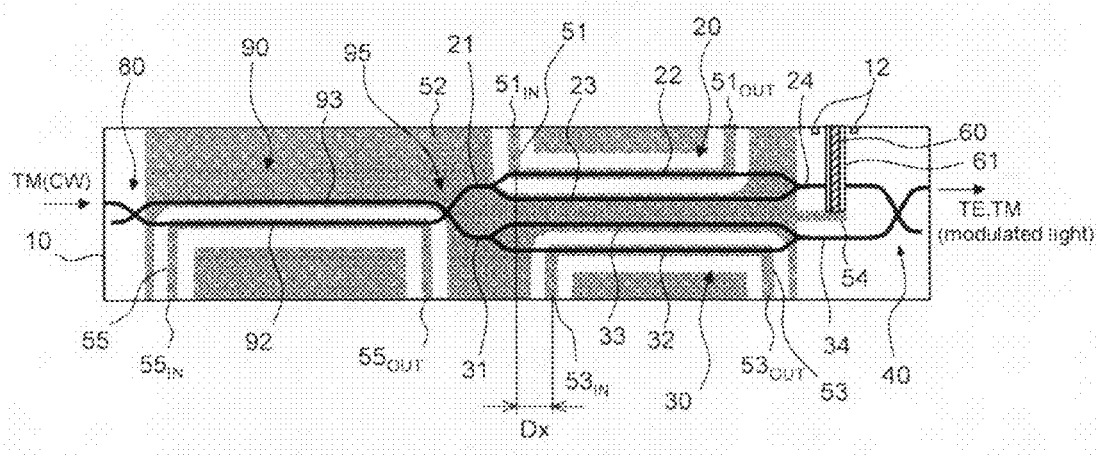
FIG. 11 is a plan view illustrating a configuration of an optical waveguide device according to a second embodiment.
Figure 14:
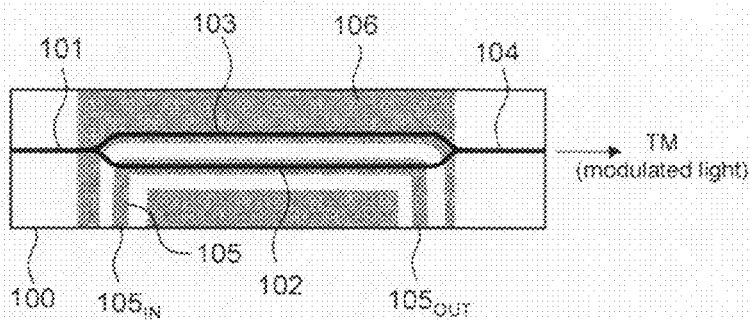
FIG. 14 is a diagram illustrating one example of a conventional optical waveguide device.
Figure 15:
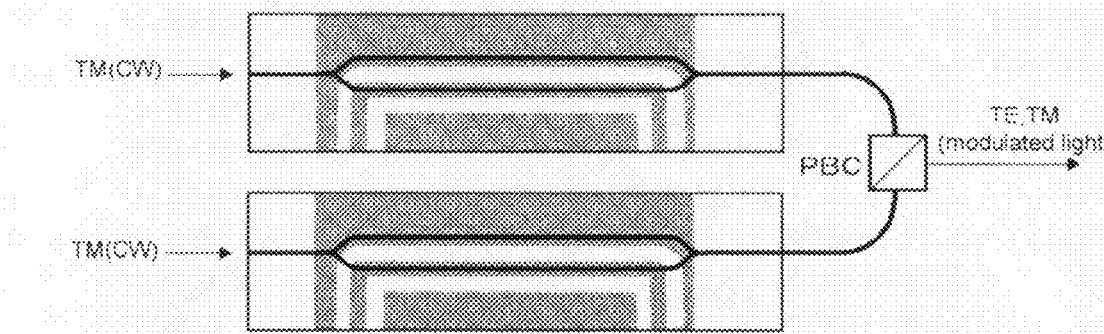
FIG. 15 is a diagram of a configuration in which two conventional optical modulating sections are used and configured as a transmitter for polarization multiplexed communication.

Next is a description of an optical waveguide device according to another embodiment. FIG. 11 is a plan view illustrating a configuration of an optical waveguide device according to a second embodiment. This optical waveguide device is configured as an optical modulator that can generate a polarization multiplexed RZ (Return to Zero) signal.

A major difference in the configuration from the optical waveguide device according to the first embodiment is that a branching section 80, a third optical modulating section 90, and a wave coupling/branching section 95 are further formed on the top face of the substrate 10. The configuration of other parts is the same as that of the first embodiment, and hence, the explanation thereof is omitted here. Moreover, the various modification examples of the first embodiment can also be applied to this embodiment.

In FIG. 11, the branching section 80, the third optical modulating section 90, and the wave coupling/branching section 95 are arranged on an upstream side in a light propagating direction than the first optical modulating section 20 and the second optical modulating section 30 arranged substantially in parallel on the top face of the substrate 10.

The branching section 80 is for branching the input light into two, and supplying the branched input light to the third optical modulating section 90, and for example, a waveguide type 1×2 coupler or a Y branching waveguide can be used. Moreover a waveguide type 2×2 coupler can also be used.

The third optical modulating section 90 includes; a pair of branched waveguides 92 and 93, a signal electrode 55 and a ground electrode 52 for modulating the light propagating on the pair of branched waveguides 92 and 93. Also in the present embodiment including the third optical modulating section 90, the first optical modulating section 20, the second optical modulating section 30, and the third optical modulating section 90 commonly use the ground electrode 52, but respective ground electrodes may be provided separately.

The signal electrode 55 of the third optical modulating section 90 is formed along immediately above one branched waveguide 92 of the third optical modulating section 90. The ground electrode 52 is formed isolated from the signal electrode 51 of the first optical modulating section 20, the signal electrode 53 of the second optical modulating section 30, and the signal electrode 55 of the third optical modulating section 90, and includes a part formed along immediately above the other branched waveguide 23 of the first optical modulating section 20, the other branched waveguide 33 of the second optical modulating section 30, and the other branched waveguide 93 of the third optical modulating section 90. Similarly to the signal electrode 51 of the first optical modulating section 20 and the signal electrode 53 of the second optical modulating section 30, the output terminal $55_{OUT}$ of the signal electrode 55 of the third optical modulating section 90 is connected to the ground electrode 52 via a resistance (not illustrated in the drawing) to constitute a traveling wave electrode of the third optical modulating section 90, and a microwave electric signal is applied thereto from an input terminal $55_{IN}$.

The wave coupling/branching section 95 is, for example, a waveguide type 2×2 coupler, in which an input side thereof is connected to an output section of the third optical modulating section 90, that is, to terminals of the pair of branched waveguides 92 and 93, respectively, and an output side thereof is respectively connected to an input waveguide 21 of the first optical modulating section 20 and an input waveguide 31 of the second optical modulating section 30.

The branching section 80, the pair of branched waveguides 92 and 93 of the third optical modulating section 90, and the wave coupling/branching section 95 are formed in the same manner as the optical waveguide of the first optical modulating section 20, the optical waveguide of the second optical modulating section 30, and the wave coupling section 40. Moreover the signal electrode 55 of the third optical modulating section 90 is formed in the same manner as the signal electrode 51 of the first optical modulating section 20, the ground electrode 52, and the signal electrode 53 of the second optical modulating section 30.

Furthermore in this embodiment, when the TM-mode light (CW light) is input, the light is branched into two by the branching section 80, and respectively transmitted to the branched waveguides 92 and 93 of the third optical modulating section 90.

A clock signal is applied to the signal electrode 55 of the third optical modulating section 90 as a microwave electric signal, and an NRZ (Non Return to Zero) data signal is applied to the signal electrode 51 of the first optical modulating section 20 and the signal electrode 53 of the second optical modulating section 30 as a microwave electric signal. That is to say, the third optical modulating section 90 operates as a clock modulator that modulates input light using the clock signal and outputs an optical clock signal, and the first optical modulating section 20 and the second optical modulating section 30 each operate as a data modulator that modulates the input light (that is, the optical clock signal output from the third optical modulating section 90) using the NRZ data signal and outputs an optical RZ signal.

The wave coupling section 40 receives the input of the signal light (TE-mode) from the first optical modulating section 20 through the ½ wave plate 60, and the signal light (TM-mode) from the second optical modulating section 30, and couples the lights while maintaining the respective polarization directions to generate and output a polarization multiplexed RZ signal.

Here, when lights that have respectively propagated on the pair of branched waveguides 92 and 93 of the third optical modulating section 90 are input, the wave coupling/branching section (2×2 coupler) 95 couples these lights to generate the optical clock signal, and then branches the optical clock signal to output an optical complementary signal with phases thereof mutually inverted. Therefore optical clock signals are input to the first optical modulating section 20 and the second optical modulating section 30, with their timings shifted by a half cycle of the clock signal.

In this case, for example, the input timing of the NRZ data signal to the signal electrode 51 of the first optical modulating section 20, and the input timing of the NRZ data signal to the signal electrode 53 of the second optical modulating section 30 need to be shifted by a half cycle of the clock signal. However, it is desired to equalize the input timing of the NRZ data signals to the two signal electrodes 51 and 53.

Therefore, in this embodiment, a length of the optical waveguide (light propagating distance) from the output section of the wave coupling/branching section 95 (or the output section of the third optical modulating section 90) to an interactive section of the first optical modulating section 20, and a length of the optical waveguide (light propagating distance) from the output section of the wave coupling/branching section 95 (or the output section of the third optical modulating section 90) to an interactive section of the second optical modulating section 30 are arranged to differ by a half wavelength of the clock signal. Specifically, in this embodiment, the first optical modulating section 20 and the second optical modulating section 30 are arranged substantially in parallel on the substrate 10 and have substantially the same configuration (arranged symmetrically on the substrate 10). Therefore, as illustrated in FIG. 11, the signal electrode 51 of the first optical modulating section 20 and the signal electrode 53 of the second optical modulating section 30 are arranged so as to be shifted by a half wavelength Dx of the clock signal in the light propagating direction.

The optical interactive section refers to a portion where the microwave electric signal and the light interact in each optical modulating section.

In the optical waveguide device according to this embodiment described above, the third optical modulating section 90, the wave coupling/branching section 95, the first optical modulating section 20, the second optical modulating section 30, and the wave coupling section 40 are formed on one substrate 10, and the groove 61 for cutting only the output waveguide 24 of the first optical modulating section 20 is formed, and the ½ wave plate 60 is inserted into the formed groove 61. Here, the third optical modulating section 90 is configured as the clock modulator driven by the clock signal, and the first optical modulating section 20 and the second optical modulating section 30 are configured as the data modulator driven by the NRZ data signal. As a result, the optical modulator that can generate the polarization multiplexed RZ signal can be considerably downsized.

Next a modification example of the optical waveguide device according to the second embodiment is illustrated in FIG. 12 and FIG. 13.

FIRST MODIFICATION EXAMPLE

Also in the optical waveguide device according to the second embodiment, similarly to the aforementioned sixth modification example (FIG. 10) of the optical waveguide device according to the first embodiment, the input terminal (signal input terminal) $51_{IN}$ of the signal electrode 51 of the first optical modulating section 20, and the input terminal (signal input terminal) $53_{IN}$ of the signal electrode 53 of the second optical modulating section 30 may be arranged on the same side face side of the substrate 10.

In this case, the lengths of respective sections are set in the following manner, taking into consideration a difference in optical lengths from the output section of the third optical modulating section 90 to the respective interactive sections of the first optical modulating section 20 and the second optical modulating section 30, and a difference in optical lengths for the microwave electric signal from the input section (signal input terminal) of the electric signal to the interactive section (that is, the feeder section of the signal electrode).

That is to say, at first as illustrated in FIG. 12, it is assumed that a length of the feeder section of the signal electrode 51 of the first optical modulating section 20 (a length from the input terminal $51_{IN}$ to the interactive section) is Lf1, a length of the feeder section of the signal electrode 53 of the second optical modulating section 30 (a length from the input terminal $53_{IN}$ to the interactive section) is Lf2, and an effective refractive index for the microwave electric signal propagating on the signal electrode 51 of the first optical modulating section 20 and the signal electrode 53 of the second optical modulating section 30 is Ne. Moreover, it is assumed that a length from the output section of the third optical modulating section 90 to a starting point of the interactive section of the first optical modulating section 20 (a starting point of the signal electrode 51) is Lo1, a length from the output section of the third optical modulating section 90 to a starting point of the interactive section of the second optical modulating section 30 (a starting point of the signal electrode 53) is Lo2, and the effective refractive index for the light propagating on the optical waveguides of the first optical modulating section 20 and the second optical modulating section 30 is No.

The optical length of the feeder section of the signal electrode 51 of the first optical modulating section 20 becomes (Ne×Lf1), the optical length of the feeder section of the signal electrode 53 of the second optical modulating section 30 becomes (Ne×Lf2), the optical length of the optical waveguide from the third optical modulating section 90 to the first optical modulating section 20 becomes (No×Lo1), and the optical length of the optical waveguide from the third optical modulating section 90 to the second optical modulating section 30 becomes (No×Lo2).

Consequently, when {No(Lo1−Lo2)−Ne(Lf1−Lf2)} becomes an odd multiple of the half wavelength c/(20 (in which, c: luminous flux, f: clock frequency) of the clock signal, the timing of the clock at the starting point of the interactive section of the first optical modulating section 20 and at the starting point of the interactive section of the second optical modulating section 30 coincide.

Therefore, the length of the optical waveguide and the electrode are set so as to satisfy the following equation, where N is an integer.

$$No(Lo1-Lo2)-Ne(Lf1-Lf2)=(2N+1)\cdot c/(2f)$$

As a result, the two connector sections can be arranged on the same side of the package, thereby enabling more compact implementation, and the NRZ data can be input to the first optical modulating section 20 and the second optical modulating section 30 at the same timing.

SECOND MODIFICATION EXAMPLE

In the optical waveguide device according to the second embodiment, the third optical modulating section 90 operating as the clock modulator, and the first optical modulating section 20 and the second optical modulating section 30 operating as the data modulator are serially arranged. Therefore, for example, when the size of the optical waveguide device (that is, the chip size) is limited, the length of the interactive sections (electrodes) of the respective optical modulating sections becomes short, and as a result, the driving voltage might increase.

Therefore, as illustrated in FIG. 13, the first optical modulating section 20, the second optical modulating section 30, and the third optical modulating section 90 can be arranged substantially in parallel on the top face of the substrate 10, and the optical waveguide connecting one output section of the wave coupling/branching section 95 connected to the output section of the third optical modulating section 90, to the first optical modulating section 20, and the optical waveguide connecting the other output section of the wave coupling/branching section 95 connected to the output section of the third optical modulating section 90, to the second optical modulating section 30 can be configured as bent waveguides 96 and 97, respectively, formed in a circular arc shape so as to turn back in the light propagating direction. As a result, even if there is a limitation on the chip size, the length of the interactive sections of the respective optical modulating sections can be ensured, and an increase in the driving voltage can be suppressed.

Here, if the bending extent of the bent waveguides 96 and 97 become intense (if the curvature becomes large), a radiation loss of the propagating light might increase. Therefore, in this modification example, grooves in a circular arc (circular-arc grooves) 98 and 99 are formed, respectively, along outer circumferences of the bent waveguides 96 and 97. As a result, a light confinement effect with respect to the inside of the bent waveguides 96 and 97 is improved, and the optical loss can be suppressed. If a depth of the circular-arc grooves 98 and 99, and a depth of the pair of notches 12, 12 which become a marker at the time of performing the dicing process, are made substantially equal, the circular-arc grooves 98 and 99 and the pair of notches 12, 12 can be formed together efficiently, for example, by etching.

Moreover, in the optical waveguide device according to the second embodiment, the first optical modulating section 20 and the second optical modulating section 30 functioning as the data modulator are Mach-Zehnder intensity modulators, however, they are not limited thereto. The first optical modulating section 20 and the second optical modulating section 30 may be phase modulators, or DQPSK (Differential Quadrature Phase Shift Keying) modulators.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical waveguide device comprising:
a substrate having an electro-optic effect; and
a first optical waveguide and a second optical waveguide formed substantially in parallel on a top face of the substrate,
wherein there is formed a groove that is configured to cut only the first optical waveguide, of the first optical waveguide and the second optical waveguide, and the groove is formed in a side face of the substrate on a first optical waveguide side, and penetrates from the top face to a bottom face of the substrate.

2. An optical waveguide device according to claim 1, further comprising an optical component inserted into the groove.

3. An optical waveguide device comprising:
a substrate having an electro-optic effect;
a first optical modulating section formed on a top face of the substrate, and having an optical waveguide, and a signal electrode and a ground electrode that are arranged to modulate light propagating on the optical waveguide;
a second optical modulating section formed on the top face of the substrate substantially in parallel with the first optical modulating section, and having an optical waveguide, and a signal electrode and a ground electrode that are arranged to modulate light propagating on the optical waveguide;
a mode conversion element arranged in a middle of an output waveguide of the first optical modulating section, that converts TM/TE modes of light propagating on the output waveguide; and
a coupling section, formed on the top face of the substrate, that polarization-couples output light of the first optical modulating section that has passed through the mode conversion element, with output light of the second optical modulating section, to generate polarization-multiplexed light,
wherein the mode conversion element is inserted into a groove that is configured to cut only an output waveguide of the first optical modulating section, of the optical waveguides formed on the top face of the substrate, and
wherein the groove is formed in a side face of the substrate on a first optical modulating section side, and penetrates from the top face to a bottom face of the substrate.

4. An optical waveguide device according to claim 3, wherein the mode conversion element is secured by an adhesive having a refractive index substantially the same as a refractive index of the mode conversion element.

5. An optical waveguide device according to claim 3, wherein the mode conversion element is a ½ wave plate that rotates a plane of polarization of light by about 90°.

6. An optical waveguide device according to claim 3, wherein the groove is inclined by a predetermined angle from perpendicular with respect to the output waveguide of the first optical modulating section.

7. An optical waveguide device according to claim 3, further comprising a wave branching section, formed on the top face of the substrate, that branches input light into two to supply one of the lights to the first optical modulating section and to supply the other of the lights to the second optical modulating section.

8. An optical waveguide device according to claim 7, wherein a branching ratio of the wave branching section is set so that power of output light from the first optical modulating section via the mode conversion element, and power of output light from the second optical modulating section become equal to each other.

9. An optical waveguide device according to claim 3,
wherein at least one of the output waveguide of the first optical modulating section and an output waveguide of the second optical modulating section is formed curved to thereby expand a gap therebetween, and
wherein the groove is arranged to cut the output waveguide of the first optical modulating section at a position where the gap between the output waveguide of the first optical modulating section and the output waveguide of the second optical modulating section is expanded.

10. An optical waveguide device according to claim 3, further comprising a pair of notches sandwiching the groove, in an edge of the top face of the substrate on the first optical modulating section side.

11. An optical waveguide device according to claim 3, further comprising a processing support plate attached to the top face of the substrate,
wherein the groove penetrates from a top face of the processing support plate to the bottom face of the substrate.

12. An optical waveguide device according to claim 3, further comprising an electrode formed on the top face of the substrate, and positioned between the output waveguide of the first optical modulating section and the output waveguide of the second optical modulating section,
wherein the groove is formed to have a depth that reaches to the electrode.

13. An optical waveguide device according to claim 12, wherein the electrode conducts with at least one of the ground electrode of the first optical modulating section and the ground electrode of the second optical modulating section.

14. An optical waveguide device according to claim 3, wherein a signal input terminal of the signal electrode of the first optical modulating section, and a signal input terminal of the signal electrode of the second optical modulating section are arranged on the same side face side of the substrate.

15. An optical waveguide device according to claim 3, further comprising:
a third optical modulating section formed on the top face of the substrate, and having a pair of branched waveguides, and a signal electrode and a ground electrode that are arranged to modulate light propagating on the pair of branched waveguides; and
a wave coupling/branching section, formed on the top face of the substrate, that couples the light propagating on the pair of branched waveguides of the third optical modulating section, and further branches the coupled light to supply one of the lights to the first optical modulating section and to supply the other of the lights to the second optical modulating section.

16. An optical waveguide device according to claim 15,
wherein the first optical modulating section and the second optical modulating section are configured as a data modulator driven by an NRZ data signal, and
wherein the third optical modulating section is configured as a clock modulator driven by a clock signal.

17. An optical waveguide device according to claim 16,
wherein the wave coupling/branching section outputs complementary signal light with phases thereof mutually inverted, and
wherein a length of an optical waveguide from an output section of the third optical modulating section to an interactive section of the first optical modulating section, and a length of an optical waveguide from the output section of the third optical modulating section to an interactive section of the second optical modulating section differ by a half cycle of the clock signal.

18. An optical waveguide device according to claim 17,
wherein a length of the optical waveguide from the output section of the third optical modulating section to the first optical modulating section, and a length of the optical waveguide from the output section of the third optical modulating section to the second optical modulating section are formed equal, and
wherein the signal electrode of the first optical modulating section and the signal electrode of the second optical modulating section are arranged to be shifted by a half wavelength of the clock signal in a light propagating direction.

19. An optical waveguide device according to claim 16,
wherein the wave coupling/branching section outputs complementary signal light with phases thereof mutually inverted, and
wherein when a length of a feeder section of the signal electrode of the first optical modulating section is Lf1, a length of a feeder section of the signal electrode of the second optical modulating section is Lf2, an effective refractive index for a microwave electric signal propagating on each of the feeder sections is Ne, a length of an optical waveguide from an output section of the third optical modulating section to an interactive section of the first optical modulating section is Lo1, a length of an optical waveguide from the output section of the third optical modulating section to an interactive section of the second optical modulating section is Lo2, an effective refractive index for the light propagating on the optical waveguides is No, a speed of light is c, and a frequency of the clock signal is f, the following equation is satisfied, $$No(Lo1-Lo2)-Ne(Lf1-Lf2)=(2N+1)\cdot c/(2f)$$

where N is an integer.

20. An optical waveguide device according to claim 15,
wherein the first optical modulating section, the second optical modulating section, and the third optical modulating section are arranged substantially in parallel, and
wherein one output section of the wave coupling/branching section and the first optical modulating section, and the other output section of the wave coupling/branching section and the second optical modulating section are each connected by bent waveguides formed in a circular arc shape, turning back in the light propagating direction.

21. An optical waveguide device according to claim 20, wherein circular-arc grooves are formed, respectively, along outer circumferences of the bent waveguides on the top face of the substrate.

22. An optical waveguide device according to claim 21, further comprising a pair of notches sandwiching the groove, in an edge of the top face of the substrate on the first optical modulating section side,
wherein a depth of the circular-arc grooves, and a depth of the pair of notches are made substantially equal.

23. A method of producing an optical waveguide device, comprising:
forming a first optical waveguide and a second optical waveguide substantially in parallel on a top face of a substrate having an electro-optic effect;
fixing one side face of the substrate so that the first optical waveguide is positioned on an upper side and the second optical waveguide is positioned on a lower side; and
forming, in the other side face of the substrate, a groove that is configured to cut only the first optical waveguide, of the first optical waveguide and the second optical waveguide, and that penetrates from the top face to a bottom face of the substrate, by advancing a dicing saw from the top face side to the bottom face side of the substrate or from the bottom face side to the top face side of the substrate.

24. A method of producing an optical waveguide device according to claim 23, further comprising forming a pair of notches in an edge of the top face of the substrate on the first optical modulating section side,
wherein forming the groove involves advancing the dicing saw between the pair of notches, to penetrate from the top face to the bottom face of the substrate.

* * * * *